Aug. 4, 1936.     C. W. TUCKER     2,049,979
TREATMENT OF HYDROGEN PEROXIDE VAPORS
Filed June 9, 1934
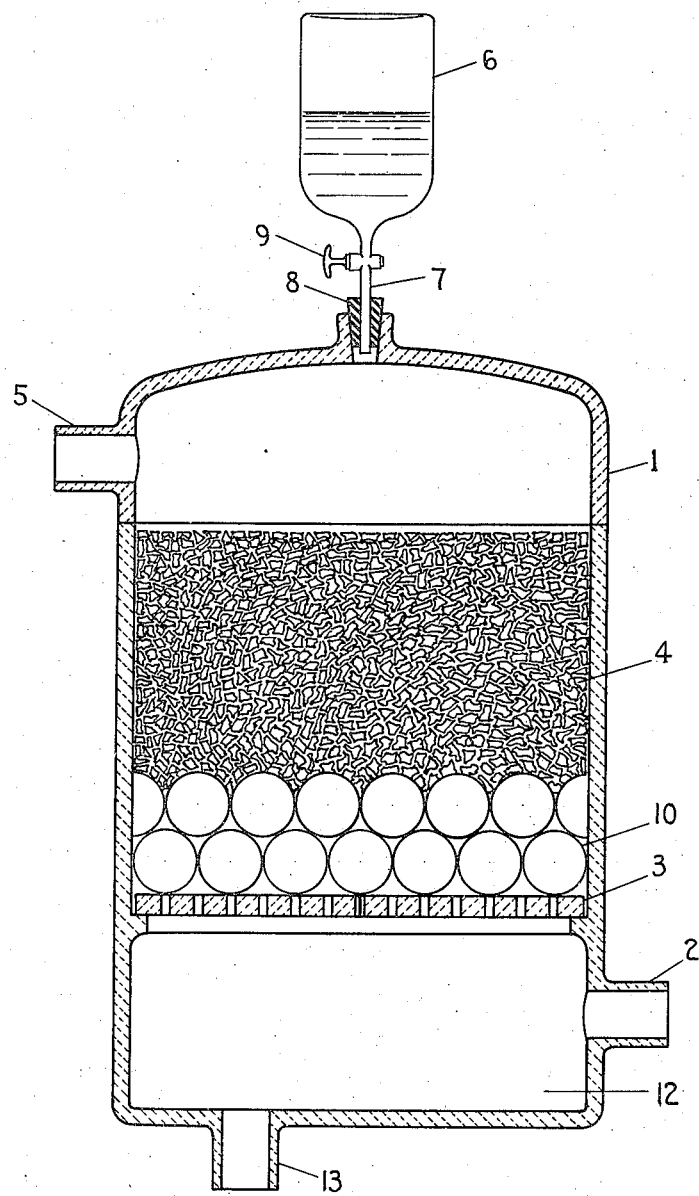
INVENTOR.
Carl W. Tucker
BY *P. M. Paulson*
ATTORNEY Patented Aug. 4, 1936

2,049,979

UNITED STATES PATENT OFFICE 2,049,979

TREATMENT OF HYDROGEN PEROXIDE VAPORS

Carl William Tucker, Niagara Falls, N. Y., assignor to E. I. du Pont de Nemours & Company, Incorporated, Wilmington, Del., a corporation of Delaware Application June 9, 1934, Serial No. 729,897

10 Claims. (Cl. 202—66)

This application relates to the manufacture of hydrogen peroxide and more particularly to the removal of acid from hydrogen peroxide vapors in distillation processes incidental to the manufacture of hydrogen peroxide.

Commercial hydrogen peroxide ordinarily contains more or less acid as a result of the methods of manufacture. Ordinarily small amounts of acid in the commercial product are not objectionable but if large amounts are present they must be removed by some method, before the product is suitable for use. In the various methods of manufacturing hydrogen peroxide a highly acid product of low hydrogen peroxide content ordinarily is first produced which must be distilled to separate hydrogen peroxide from the acid and produce a solution of a desired hydrogen peroxide concentration, e. g., 30% by weight of hydrogen peroxide. For example one method of making hydrogen peroxide comprises electrolyzing a solution of sulfuric acid to produce persulfuric acid. The persulfuric acid solution then is subjected to a vacuum process in which the persulfuric acid is hydrolyzed to hydrogen peroxide and sulfuric acid and hydrogen peroxide vapors are separated from the acid solution. The resulting vapors of hydrogen peroxide and water then are further distilled or rectified to produce hydrogen peroxide of the desired concentration. The method commonly used for distilling the persulfuric acid solution to convert it to sulfuric acid and hydrogen peroxide comprises continuously passing the solution through a tubular still. The material leaving the still consists of a mixture of liquid and vapors which is led through a trap or similar device for separating liquid from vapors and the vapors issuing from the separating device then are led to a second distillation or rectification apparatus for concentrating the hydrogen peroxide to the desired strength. During this process, more or less of the acid solution issuing from the first still occurs in the form of very fine droplets or mist which does not readily agglomerate and hence is not separated from the hydrogen peroxide and water vapors in the liquid separating device. Acid therefore is carried over into the concentration still with the result that the concentrated product contains unduly large amounts of acid.

An object of this invention is to provide a process of manufacturing hydrogen peroxide whereby the amount of acid in the final product is decreased. A further object is to remove acid mist from hydrogen peroxide vapors. Other objects will be apparent from the following description of my invention.

The above objects are accomplished in accordance with my invention by contacting hydrogen peroxide-water vapors containing acid mist with solid surfaces which are covered with a film of liquid in which the acid is soluble, under subatmospheric pressure. In order to avoid the use of unduly large apparatus, I prefer to pass the mist-containing vapor through a tower packed with solid particles of a suitable size, the surfaces of which are wet with a solution of the acid which is to be removed from the vapor.

In accordance with my invention, the size of the packing material is selected to give the most efficient operation. If the average diameter of the particles is too small, the flow of the vapors will be obstructed to an undue extent. On the other hand, if the size of the particles is too large the effective surface is thereby decreased and the required size of the apparatus is correspondingly increased.

It has been generally considered that vacuum systems for distilling and rectifying hydrogen peroxide solutions should have relatively wide openings through which the vapors pass, to permit an unrestricted flow of vapor. Such systems ordinarily consist of a rather complicated system of stills, packed rectifying towers, condensers and receivers, with a vacuum pump connected at or near the receiver end. The rectifying towers usually are provided with packing material which offers relatively little resistance to the flow of vapors, e. g. material such as large Gutemann balls or Raschig rings 1 to 2 inches in diameter. Resistance to the vapor flow at any point has been avoided to prevent back pressures, thus to maintain the high vacuum required for efficient operation.

I have now discovered that the vapors in a hydrogen peroxide distillation or rectification system may be passed through a packing of relatively small sized solid material without materially increasing the pressure in the system, provided that the distance of travel through such packing is not unduly long. I have found, for example that the vapors may be passed through a 15 inch layer of packing material which is less than 1 inch average diameter and may be as small as ¼ inch average diameter, without materially increasing the pressure in any part of the system. With larger sized packing material, the depth of the layer may be correspondingly increased without disturbing the pressure relationship.

In practicing my invention, I prefer to pass the vapor which is to be freed of acid mist through a layer of packing material having an average diameter of ¼ to ¾ inch and a depth of 15 to 20 inches. It is essential that the surface of the packing material be wet with acid solution; otherwise little or no acid mist will be removed from the vapors. However, if the vapors are passed through a dry packing material a small amount of condensation will occur and gradually build up the required liquid film. This, however, ordinarily requires one to several days. I therefore prefer to wet the surface of the packing material with acid before passing the vapors through it.

An apparatus suitable for carrying out my invention is illustrated in the annexed drawing. The vessel 1, employed to retain the packing material, may be formed of glass or ceramic material and is provided with inlets and outlets as shown. The mixture of water vapor, hydrogen peroxide vapor, and the atomized acid impurities entrained in the vapor is permitted to flow into the apparatus through inlet tube 2. The mixture passes upwardly through the perforated plate 3 and from there through the layer of finely crushed quartz 4. Here the entrained misty impurities are dissolved in the liquid which adheres to the solid surfaces of the quartz. The purified vapors pass outwardly through exit tube 5.

Above the crushed quartz layer 4 there is provided a container or bottle 6 which is filled with the solvent for the acid impurities which is employed initially to wet the surfaces of the finely divided quartz particles functioning as the acid removal layer. As shown, this bottle has a discharge pipe 7 projecting into the ceramic vessel through a rubber stopper 8 closing an opening into that vessel. Valve 9 is provided to control the flow of acid or other liquid employed as the solvent on to the crushed quartz layer 4. This layer is supported on a double row of Gutemann balls 10, which are in turn supported by the perforated plate.

When the apparatus is first used a sufficient quantity of the solvent for the acid mist is permitted to run in from the bottle in order that the surfaces of the finely crushed quartz layer may be thoroughly wet. As indicated this solvent may be sulfuric acid of approximately the same order of concentration as that which is present in the fine mist to be removed from the vapors of hydrogen peroxide.

A compartment 12 is provided in the lower end of the ceramic vessel below the perforated plate 3 and in this compartment the removed acid impurities collect. Opening 13 is provided in the bottom of the vessel so that the accumulated acid may be removed from this compartment.

The following example illustrates one method of practicing my invention:

*Example*

A solution of persulfuric acid obtained by the electrolysis of sulfuric acid was passed through a steam heated tube still under a partial vacuum. The mixture of liquid and vapor issuing from the tube still was passed through a separating device consisting of a baffled chamber. The vapors issuing from the liquid-vapor separating device contained considerable amounts of sulfuric acid in the form of a fine mist suspended in the vapors of hydrogen peroxide and water. This mixture of mist and vapor was passed upwardly into a stoneware tower two feet in diameter, which contained a 15 inch layer of crushed quartz supported on a double layer of 4 inch Gutemann balls. The diameters of the particles of crushed quartz used in the tower varied from ¼ to ¾ inch. An open space was provided at the bottom of the tower below the double layer of Gutemann balls. The vapors freed from acid mist were led out at the top part of the tower while the acid was allowed to go out at the bottom of the open space. The hydrogen peroxide and water vapors then were led to a vacuum rectifying system where they were concentrated to 100 volume hydrogen peroxide solution. The acid in the concentrated product was equivalent to 0.16–0.078 grams of sulfuric acid per 100 cc. of 100 volume hydrogen peroxide solution. When the process was run without passing the vapors through the quartz packed tower, the acid in the final product varied from 0.2 to 0.6 grams of sulfuric acid per 100 cc. of product.

I claim:

1. A process for removing suspended acid mist from hydrogen peroxide vapors comprising passing said vapors over a solid surface inert to said vapors wet with a liquid in which the acid is soluble, said liquid consisting essentially of sulfuric acid solution.

2. A process for removing suspended acid mist from hydrogen peroxide vapors comprising passing said vapors over a solid surface inert to said vapors wet with a solution of the acid to be removed, said liquid consisting essentially of sulfuric acid solution.

3. A process for removing suspended acid mist from hydrogen peroxide vapors comprising passing said vapors through a layer of solid particles inert to said vapors and having an average diameter of not less than about ¼ inch, the surfaces of which are wet with a liquid in which the acid is soluble, said liquid consisting essentially of sulfuric acid solution.

4. A process for removing suspended sulfuric acid mist from hydrogen peroxide vapors comprising passing said vapors through a layer of solid particles inert to said vapors and having an average diameter of ¼ to 1 inch, the surfaces of which are wet with sulfuric acid solution.

5. A process for removing suspended sulfuric acid mist from hydrogen peroxide vapors comprising passing said vapors through a layer of solid particles inert to said vapors and having an average diameter of not less than about ¼ inch the surfaces of which are wet with sulfuric acid solution, the depth of said layer being not less than about 15 inches.

6. A process for removing suspended sulfuric acid mist from hydrogen peroxide vapors resulting from vacuum distillation of said hydrogen peroxide which comprises passing said vapors through a layer of quartz fragments having an average diameter of ¼ to ¾ inch, the surfaces of which are wet with sulfuric acid solution, said layer being 15 to 20 inches in depth.

7. In a process for producing hydrogen peroxide by hydrolysis of persulfuric acid, the step comprising passing a mixture of hydrogen peroxide and water vapors resulting from vacuum distillation of a persulfuric acid solution and containing a suspended mist of sulfuric acid solution over a solid surface inert to said vapors wet with a liquid in which the acid is soluble, said liquid consisting essentially of sulfuric acid solution.

8. In a process for producing hydrogen peroxide by hydrolysis of persulfuric acid, the step comprising passing a mixture of hydrogen peroxide and water vapors resulting from vacuum distillation of a persulfuric acid solution and containing a suspended mist of sulfuric acid solution through a layer of solid particles inert to said vapors and having an average diameter of not less than about ¼ inch, the surfaces of which are wet with sulfuric acid solution.

9. In a process for producing hydrogen peroxide by hydrolysis of persulfuric acid, the step comprising passing a mixture of hydrogen peroxide and water vapors containing a suspended mist of sulfuric acid solution through a layer of solid particles having an average diameter of not less than about ¼ inch the surfaces of which are wet with sulfuric acid solution, said layer being not less than about 15 inches.

10. In a process for producing hydrogen peroxide by hydrolysis of persulfuric acid, the step comprising passing a mixture of hydrogen peroxide and water vapors resulting from vacuum distillation of a persulfuric acid solution and containing a suspended mist of sulfuric acid solution through a layer of quartz fragments having an average diameter of ¼ to ¾ inch, the surfaces of which are wet with sulfuric acid solution, said layer being 15 to 20 inches in depth.

CARL WILLIAM TUCKER.